United States Patent
Fritsch et al.

(10) Patent No.: US 9,721,573 B2
(45) Date of Patent: Aug. 1, 2017

(54) DECODING-TIME PREDICTION OF NON-VERBALIZED TOKENS

(71) Applicant: MModal IP LLC, Franklin, TN (US)

(72) Inventors: Juergen Fritsch, Pittsburgh, PA (US);
Anoop Deoras, San Jose, CA (US);
Detlef Koll, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 0 days.

(21) Appl. No.: 14/571,697

(22) Filed: Dec. 16, 2014

(65) Prior Publication Data

US 2015/0095025 A1   Apr. 2, 2015

Related U.S. Application Data

(63) Continuation of application No. 12/566,785, filed on Sep. 25, 2009, now Pat. No. 8,918,317.

(60) Provisional application No. 61/100,184, filed on Sep. 25, 2008.

(51) Int. Cl.
| | |
|---|---|
| *G10L 15/00* | (2013.01) |
| *G10L 19/00* | (2013.01) |
| *G10L 15/197* | (2013.01) |
| *G10L 15/26* | (2006.01) |
| *G10L 15/06* | (2013.01) |

(52) U.S. Cl.
CPC ........ *G10L 19/0018* (2013.01); *G10L 15/063* (2013.01); *G10L 15/197* (2013.01); *G10L 15/26* (2013.01); *G10L 15/265* (2013.01)

(58) Field of Classification Search
CPC .............................. G06F 17/24; G06F 17/211
USPC ....................................................... 704/9, 231
See application file for complete search history.

(56) References Cited

U.S. PATENT DOCUMENTS

| | | | | |
|---|---|---|---|---|
| 5,111,398 A | * | 5/1992 | Nunberg | G06F 17/274 704/6 |
| 7,580,838 B2 | * | 8/2009 | Divay et al. | 704/257 |
| 8,306,356 B1 | * | 11/2012 | Bever | G06K 9/723 382/275 |
| 2002/0069055 A1 | * | 6/2002 | Tang et al. | 704/235 |
| 2003/0144842 A1 | * | 7/2003 | Addison | G10L 13/10 704/260 |
| 2003/0149562 A1 | * | 8/2003 | Walther | G06F 17/2863 704/243 |
| 2004/0138881 A1 | * | 7/2004 | Divay | G06F 17/2725 704/231 |
| 2006/0111893 A1 | * | 5/2006 | Florian | G06F 17/289 704/8 |
| 2007/0050184 A1 | * | 3/2007 | Drucker | G10L 13/00 704/3 |
| 2009/0307595 A1 | * | 12/2009 | Clark | G06T 13/40 715/728 |

* cited by examiner

*Primary Examiner* — Jakieda Jackson
(74) *Attorney, Agent, or Firm* — Blueshift IP, LLC; Robert Plotkin

(57) ABSTRACT

Non-verbalized tokens, such as punctuation, are automatically predicted and inserted into a transcription of speech in which the tokens were not explicitly verbalized. Token prediction may be integrated with speech decoding, rather than performed as a post-process to speech decoding.

17 Claims, 3 Drawing Sheets

DECODING-TIME PREDICTION OF NON-VERBALIZED TOKENS

BACKGROUND

One function performed by existing automatic speech recognizers (ASRs) is to transcribe speech to produce a document representing the content of the speech. This process is typically referred to as "dictation," and the resulting document a "transcript." If human speakers naturally spoke in the exact format required for the transcript that is desired, dictation systems could be designed to produce transcripts by performing verbatim transcription of the speaker's speech. Natural human speech, however, typically cannot be transcribed verbatim to produce the desired transcript, because (among other reasons) such speech often omits information that is needed for the transcript, such as punctuation marks (e.g., periods and commas), formatting information (e.g., boldface and italics), capitalization, and document structure. This problem poses challenges both for human transcriptionists who transcribe speech manually, and for those who design automatic dictation systems.

One way to overcome the problem of speech lacking necessary information is to train human speakers to explicitly speak (verbalize) such information when dictating, such as by saying, "new sentence today is october first two thousand and nine period." Another solution is to design a dictation system which is capable of inserting the missing information, such as punctuation, into the transcript automatically, even when such information was not explicitly verbalized by the speaker. One benefit of the latter approach is that it does not require speakers to learn how to speak in an artificial manner when dictating. Automatic punctuation insertion systems, however, are challenging to design due to the need to enable them to predict the type and location of punctuation marks accurately, automatically, and (in some cases) quickly.

Consistent and accurate prediction and insertion of all punctuation (both verbalized and non-verbalized) in transcripts of conversational speech is critical to many tasks involving automatic speech recognition. In particular, accurate phrase and sentence segmentation is needed for speech-to-speech translation, parsing, and rendering of transcribed speech into written language.

For example, there is a particularly strong need to accurately predict punctuation when transcribing medical dictation. Physicians are accustomed to documenting their patient encounters and the medical procedures they have performed by dictating a report using conversational speech. They assume that a human medical transcriptionist will listen to the dictation and clean it up, such as by correcting non-grammatical and incomplete phrases, and by inserting non-verbalized punctuation symbols where appropriate. Because doctors need to dictate a high volume of repetitive reports under tight time constraints, they often speak relatively quickly and without including discernible pauses or other prosodic cues in place of non-verbalized punctuation. In short, the lack of explicitly-verbalized punctuation in medical dictation creates a strong need for accurate punctuation prediction when transcribing such dictation, and yet the features of physicians' speech makes it particularly challenging to predict such punctuation accurately.

Existing approaches to predicting non-verbalized punctuation typically perform such prediction in a post-processing step, after the completion of speech decoding, either using the generated best-scoring hypothesis or the word lattice as input, sometimes including acoustic and/or prosodic features. For example, Stolcke et al. ("Combining Words and Speech Prosody for Automatic Topic Segmentation," *Proceedings of DARPA Broadcast News Transcription and Understanding Workshop,* 1999) have tried to make use of prosodic cues extracted from the spoken data by extracting pause durations which may indicate sentence boundaries, thus providing evidence for non-verbalized periods. As another example, Hirschberg and Nakatani ("Acoustic Indicators of Topic Segmentation," *Proceedings of ICSLP,* 1998) also made use of various acoustic/prosodic features in order to carry out topic and phrase boundary identification. In contrast, Gotoh and Renals ("Sentence Boundary Detection in Broadcast Speech Transcripts," *Proceedings of the International Speech Communication Association Workshop: Automatic Speech Recognition: Challenges for the New Millenium,* Paris, September, 2000) have tried to identify sentence boundaries in broadcast speech using statistical finite state models derived from news transcripts and speech recognizer outputs. They claim that their work is a step towards the production of structured speech transcriptions which may include punctuation or content annotation. Ramabhadran et al. ("The IBM 2006 Speech Transcription System for European Parliamentary Speeches," *Proceedings of the International Conference on Spoken Language Processing,* 2006) rely exclusively on prosodic cues for predicting non-verbalized punctuation as part of a transcription system for parliamentary speeches. Common to all of these approaches is the need for separate punctuation prediction models that are applied in a second pass after the initial decoding of speech recordings in a first pass over the data.

Such techniques have a variety of limitations. First, the use of a two-pass process, in which speech is first decoded and then punctuation is predicted as a post-process, results in punctuation prediction which is slower than needed for real-time applications. Second, such techniques typically use two language models, one for speech decoding and one for punctuation prediction. Creating and maintaining such separate language models can be time-consuming and expensive. Furthermore, the use of separate language models for speech decoding and punctuation prediction can lead to inaccuracies in both speech decoding and punctuation prediction.

What is needed, therefore, are improved techniques for predicting non-verbalized punctuation symbols and other tokens in speech for use in producing transcripts of such speech.

SUMMARY

Non-verbalized tokens, such as punctuation, are automatically predicted and inserted into a transcription of speech in which the tokens were not explicitly verbalized. Token prediction may be integrated with speech decoding, rather than performed as a post-process to speech decoding.

For example, one embodiment of the present invention is directed to a computer-implemented method comprising: (A) decoding a first portion of an audio signal into a first word in a token stream; (B) after (A), inserting a punctuation mark into the token stream at a position after the first word; and (C) after (B), decoding a second portion of the audio signal into a second word in the token stream at a position after the punctuation mark.

Another embodiment of the present invention is directed to a computer-implemented method for: (A) using a language model to decode a first portion of an audio signal into a first word in a token stream; (B) after (A), selecting a token based on the language model and the first word; (C) inserting the selected token into the token stream at a position after the first word; and (D) after (B), using the language model to decode a second portion of the audio signal into a second word in the token stream at a position after the punctuation mark.

Other features and advantages of various aspects and embodiments of the present invention will become apparent from the following description and from the claims.

DETAILED DESCRIPTION

Figure 1:
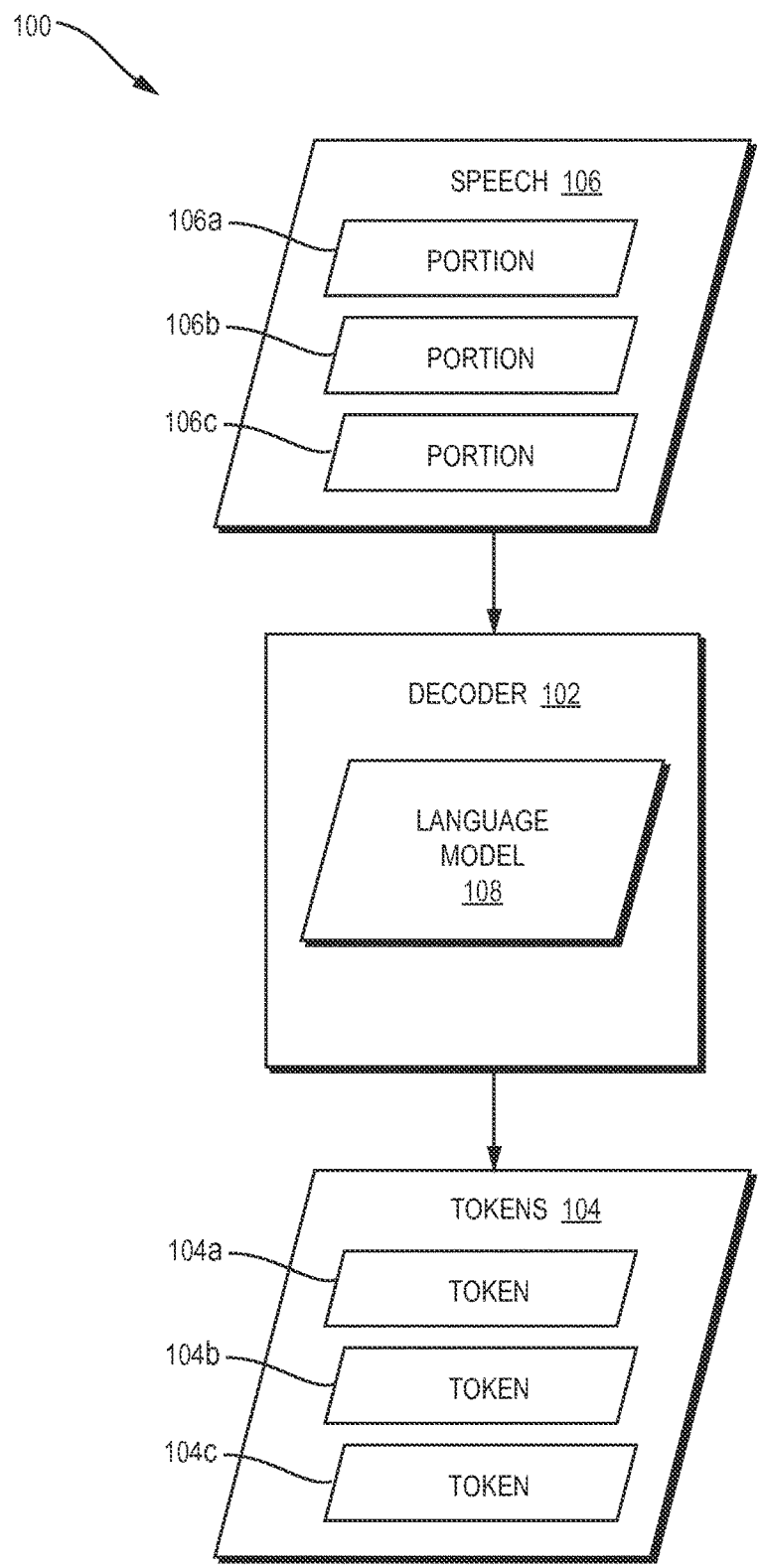
FIG. 1 is a dataflow diagram of a system for performing punctuation prediction integrally with speech decoding according to one embodiment of the present invention.

Non-verbalized tokens, such as punctuation, are automatically predicted and inserted into a transcription of speech in which at least some of the tokens were not explicitly verbalized. Token prediction may be integrated with speech decoding, rather than performed as a post-process to speech decoding. For example, lexical prediction of non-verbalized tokens may be integrated with Viterbi decoding for Large Vocabulary Conversational Speech Recognition (LVCSR) in a single pass. The techniques disclosed herein, however, may be used in connection with other kinds of decoding, with vocabularies of any size, and with either conversational or non-conversational speech recognition, in any combination.

As mentioned above, a variety of existing punctuation prediction systems rely on acoustic and/or prosodic features in the dictated speech to predict the type and location of punctuation. In contrast, embodiments of the present invention rely primarily on lexical cues (possibly, but not necessarily, in addition to acoustic and/or prosodic cues). Furthermore, such techniques may incorporate punctuation prediction into speech decoding, rather than perform such decoding as a separate processing step after speech decoding. For example, a punctuation-aware statistical language model may be used by a speech decoder, such as a large vocabulary conversational speech recognition decoder, to enable the speech decoder to predict non-verbalized punctuation without necessarily requiring acoustic evidence for each predicted punctuation. Such techniques may be used instead of, or as a supplement to, any other techniques for predicting non-verbalized punctuation and/or for recognizing verbalized punctuation.

Any of the techniques disclosed herein may be applied to predict not only punctuation symbols, but also to predict any other kind of non-verbalized tokens, such as paragraph breaks or section breaks. Therefore, although particular examples may be described herein as applying to punctuation prediction for ease of explanation, such descriptions should be understood to apply equally to prediction of other kinds of non-verbalized tokens.

Before describing embodiments of the present invention in more detail, certain experimental results which demonstrate flaws in alternative approaches will first be described. A variety of tests were performed on a medical documentation corpus. The results of these tests demonstrate that the techniques disclosed herein yield improved punctuation prediction accuracy, while reducing system complexity and memory requirements compared to prior art approaches. For example, one test was performed in which punctuation prediction was performed as a post-process to speech decoding. A written-form statistical language model was built in addition to a spoken-form statistical language model. The former was trained on fully punctuated data and served as the language model for punctuation prediction with a post-processor. The latter was trained on partially punctuated data (excluding non-verbalized punctuation) and served as the language model for automatic speech recognition.

The transcribed output generated by the automatic speech recognition system, which lacked most of the non-verbalized punctuation, was then fed into the punctuation post-processor. The post-processor implemented a variant of the light weight method described by Beeferman et al. ("Cyberpunc: A Lightweight Punctuation Annotation System for Speech," *Proceedings of the IEEE International Conference on Acoustics Speech and Signal Processing*, pp. 689-692, Seattle, Wash., 1988) for prediction and insertion of intra-sentence punctuations.

Although this approached worked well, it suffers from at least two disadvantages. First, it requires the use of a separate language model (separate from the language model used for speech decoding) to be built and loaded to carry out punctuation post processing. Second, the punctuation post-processor is applied in an independent second step to speech recognition hypotheses which may be erroneous. Errors in the speech recognition hypotheses can reduce the accuracy of punctuation prediction. The punctuation post-processor uses a written-form language model that was trained on reference transcriptions, rather than on the data that was used to train the spoken-form language model used by the speech decoder. The accuracy of punctuation prediction suffers from this mismatch.

Another test was performed which attempted to unify the punctuation prediction and decoding models by removing the punctuation prediction post-processor entirely, and using the written-form language model, instead of the spoken-form language model, in speech decoding using an LVCSR decoder. To account for non-verbalized punctuations predicted by the written-form language model, each of the punctuation symbols was modeled acoustically as a short pause, in addition to modeling them by their standard pronunciations.

The purpose of this test was to determine if modeling non-verbalized punctuations using short pauses would allow the LVCSR decoder to insert such punctuations, even in the absence of clear pauses in the acoustic signal. To allow for such cases, a model was used which allowed for the shortest possible pause using a single state Hidden Markov Model. In the test performed, the duration of this shortest pause was that of a single frame of speech of length 8 ms.

This test resulted in the insertion of many false punctuation symbols. As will be described in more detail below, embodiments of the present invention overcome this problem by enabling punctuation symbols to be predicted without requiring the presence of acoustic evidence, by relying primarily on language modeling information.

Problems evidenced by the results of such tests are addressed by various embodiments of the present invention. For example, in one embodiment of the present invention, punctuation prediction is performed using a decoder which uses fully punctuation-aware written-form language models instead of spoken-form language models, and without using a punctuation post-processor. This embodiment may use an LVCSR decoder which uses a finite state machine (FSM) abstraction layer as an interface to the language modeling component, thus allowing decoding to be performed with arbitrary language models, including, for example, finite state grammars and statistical n-gram models, as long as such models can be represented as finite state graphs. To simultaneously detect the most likely insertions and deletions of punctuation symbols (both verbalized and non-verbalized) while decoding the input audio, the finite state machine abstraction layer may be configured for use with n-gram models.

To understand the operation of this embodiment of the present invention, consider as an example the use of a trigram language model. During Viterbi beam search, the LVCSR decoder expands hypothesized partial sequences of words $w_1 \ldots w_{i-1}$ by likely following words $w_i$. To do that, it queries the language model for the probability $p(w_i|w_{i-1}, w_{i-2})$ for each word $w_i$ preceded by the 2-word history $w_{i-1}, w_{i-2}$. For every such hypothesized word, the decoder also queries the acoustic model for the likelihood of the word $w_i$ given the acoustic speech signal, and combines it with the language model probability to produce a total word score. To predict non-verbalized punctuations in the absence of acoustic evidence, the decoder needs the ability to hypothesize tokens without consuming input frames.

To achieve this result, the finite state machine is configured to include non-verbalized punctuations. The finite state machine transitions may be pruned by removing the locally improbable paths, to avoid a prohibitive increase in the number of arcs in the finite state machine. If such pruning results in acceptance of a local path containing one of the non-verbalized punctuations, P, then the next state becomes $(P,W_i)$, after consuming a spoken-word form $W_i$. In the setting of this finite state machine abstraction, if arcs passing through non-verbalized punctuations are treated as intermediate arcs, then the arc label visible to the decoder will be $W_i$ instead of P.

Information about whether a non-verbalized punctuation was hypothesized can be obtained by inspecting the history states. In particular, whenever the word history encoded by a FSM state does not match the words on the preceding arcs, the presence of a corresponding non-verbalized punctuation may be inferred. Once this is detected, a non-verbalized punctuation symbol may be inserted between the labels of the preceding two arcs of the relevant FSM state.

Although this particular technique proved relatively effective, it creates a certain amount of overhead due to the need to precompute and compare probabilities of competing transitions for each FSM state, even though many of these will never be considered by the decoder. As will now be explained in more detail, other embodiments of the present invention overcome this problem to predict punctuation with significantly reduced complexity and computational overhead.

Figure 2:
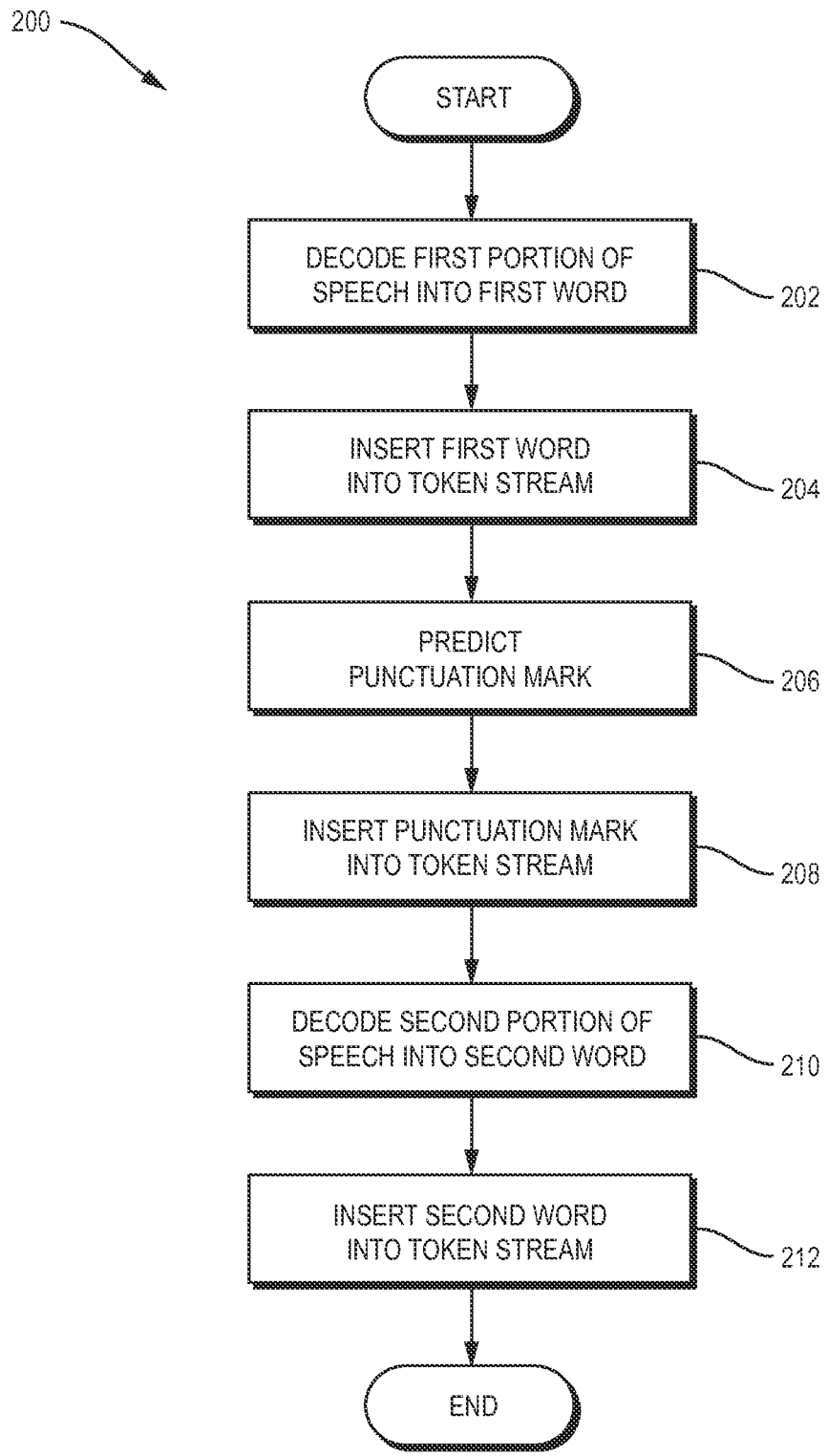
FIG. 2 is a flowchart of a method performed by the system of FIG. 1 according to one embodiment of the present invention.

In general, such embodiments of the present invention integrate prediction of non-verbalized punctuation directly into the word expansion step of a speech decoder. Referring to FIG. 1, a dataflow diagram is shown of a system 100 for performing such integrated punctuation prediction according to one embodiment of the present invention. Referring to FIG. 2, a flowchart is shown of a method 200 performed by the system 100 of FIG. 1 according to one embodiment of the present invention.

The system 100 includes a speech decoder 102. In general, the decoder 102 derives a sequence of tokens 104a-c, also referred to herein as a token stream 104, such as a sequence of words and/or punctuation marks, from speech 106. The speech 106 may take any form, such as a live audio signal generated using a microphone and transmitted by the microphone to a computer or other recording device, or a recorded audio signal stored on an analog or digital recording medium and subsequently read by the decoder 102.

The resulting token stream 104 may be tangibly stored in a computer-readable medium within a data structure, such as a text document. Although the following description may refer to a "document" in which the token stream 104 is stored, any such references apply equally to any form in which the token stream 104 is stored. For example, the decoder 102 may store the token stream 104 in an internal data structure such as a backpointer graph or a word lattice, which subsequently is used to create a text document containing the tokens 104a-c in the token stream 104. The process of creating such a document from the token stream 104 may include, for example, inserting whitespace and other characters between the tokens 104a-c and applying capitalization to the tokens 104a-c, using techniques that are well-known to those having ordinary skill in the art. Similarly, although certain tokens may be referred to herein as particular types of tokens, such as "words," these are merely examples and do not constitute limitations of the present invention.

The tokens 104a-c are assigned some relative ordering within the token stream 104, such that token 104b is said herein to be located at a position that is "after" the position of token 104a within the token stream 104, and such that token 104c is said herein to be located at a position that is "after" the position of token 104b within the token stream 104. For example, tokens 104a, 104b, and 104c may be a first word, a punctuation mark, and a second word which occur in a contiguous sequence within a text document, such as "door, while", in which "door" is the first word 104a, ",", is the punctuation mark 104b, and "while" is the second word 104c.

The speech 106 contains a plurality of portions 106a-c, each of which may take any form and be of any length. In the particular example illustrated in FIG. 1, three portions 106a-c are shown. Although in the following example, it will be assumed that the portions 106a-c represent a contiguous temporal stream of speech, in which portion 106a is followed immediately by portion 106b, which in turn is followed immediately by portion 106c, this is not a requirement of the present invention. Furthermore, the speech 106 may include any number of portions. Furthermore, the portions 106a-c need not be stored within the speech 106 as separately-marked portions, but rather are shown as distinct portions in FIG. 1 merely to facilitate the explanation of the operation of the system 100 of FIG. 1.

In general, the decoder 102 decodes a first portion of the speech 106 into a first word (or other token) (FIG. 2, step 202). Assume for purposes of example that in step 202 the decoder 102 decodes portion 106a of speech 106 to produce first word 104a. Such decoding may be performed using any speech decoding technique. The decoder 102, or other component of the system 100, inserts the first word 104a into the data structure 104 (e.g., document) (step 204).

The decoder 102 then predicts the occurrence of a non-verbalized punctuation symbol 104b in the speech stream 106, where the predicted punctuation symbol 104b occurs in sequence after the first token 104a in the sequence of tokens 104 (step 206). As will be described in more detail below, this prediction may include considering a plurality of possible tokens (possibly including a plurality of distinct punctuation symbols, such as a period, comma, and question mark). The decoder 102, or other component of the system 100, inserts the predicted punctuation symbol 104*b* into the token stream 104 at a position after that of the first word 104*a* (step 208).

When creating a document from the token stream, whitespace and other formatting may be applied to the token stream 104 in any manner. For example, if the token stream 104 is used at some point to create a text document, the position of the punctuation symbol 104*b* within such a text document may, for example, be immediately after that of the first word 104*a* within the text document (such as by inserting a period after "day" to produce the text "day."). As another example, the punctuation symbol 104*b* may be inserted into the text document such that the first word 104*a* and the punctuation symbol 104*b* are separated by whitespace (and/or other inconsequential characters) but by no other words or characters (such as by inserting a dash after a space to produce the text "day -").

The decoder 102 then decodes a second portion of the speech 106 into a second word (or other token) (step 210), making use of the fact that a non-verbalized punctuation was predicted immediately before the second word. Assume for purposes of example that the decoder 102 decodes portion 106*b* of speech 106 to produce word 104*c*. The decoder 102, or other component of the system 100, inserts the second word 104*c* into the token stream 104 at a position in the token stream 104 after that of the punctuation mark 104*b* (step 212).

The process just described integrates the prediction of punctuation with that of speech decoding in the sense that the punctuation mark 104*b* is predicted (and potentially inserted into the document 104) before the second word 104*c* is decoded (and potentially inserted into the document 104). This contrasts with conventional systems which perform punctuation prediction as a post-process, i.e., which decode the entire speech stream into a sequence of words before initiating punctuation prediction. One benefit of this process is that punctuation prediction performance can be improved in comparison to the conventional two-step-process. Another benefit is that overall transcription accuracy can be improved because a stronger language model (one which exhibits less variance) is used for both speech decoding and punctuation prediction.

Note that the first word 104*a* and the second word 104*c* may be the result of decoding a contiguous portion of the speech stream 106. For example, portions 106*a* and 106*b* of the speech stream 106 may collectively represent a single contiguous portion of the speech stream 106, and words 104*a* and 104*c* may be words resulting from decoding portions 106*a* and 106*b*, respectively. Yet the decoder 102 may predict the occurrence of punctuation mark 104*b* between words 104*a* and 104*c* even though the speech corresponding to those words is contiguous. In this case, the decoder 102 may predict the punctuation mark 104*b* even in the absence of a pause between the portions 106*a*-*b* or other acoustic/prosodic evidence for the punctuation mark 104*b*. In particular, the decoder 102 may predict the punctuation mark 104*b* without reference to the speech stream 106 and without using an acoustic model, but instead base the selection of the punctuation mark 104*b* solely on a language model 108 and text preceding the punctuation mark 104*b* (such as the first word 104*a*). If the speech stream 106 does include acoustic or prosodic evidence for a punctuation mark, the decoder 102 may use or ignore such evidence. As another example, other techniques which make use of such evidence for punctuation prediction may be combined with the techniques disclosed herein to improve punctuation prediction even further. Furthermore, the techniques disclosed herein may be generalized to include non-lexical cues, such as syntactic (e.g., part-of-speech) cues, potentially further increasing recognition accuracy.

One benefit of predicting punctuation without relying on acoustic/prosodic evidence, or without relying entirely on such evidence, is that such evidence can be an unreliable indicator of punctuation, as demonstrated by the deficiencies of the techniques described above which rely solely on acoustic/prosodic evidence. Such increased accuracy may include both increased word accuracy and increased punctuation accuracy, because traditional punctuation prediction techniques rely mostly on first-pass recognition hypotheses that contain recognition errors, while the punctuation prediction models they use are typically trained on error-free written-language texts.

The language model 108 used by the decoder 102 may be any type of language model. The language model 108 may be trained before initiation of the method 200 of FIG. 2, using a written-language document corpus or other training data which includes both words and punctuation. The decoder 102 may use the language model 108 both to decode the speech 106 into the words 104*a* and 104*c*, and to predict the punctuation mark 104*b*. In other words, the decoder 102 need not use two different language models, one for speech decoding and another for punctuation prediction. One benefit of using a single language model for both of these tasks is that only a single language model need be trained and maintained, thereby reducing the time, effort, and cost of training and maintaining the system 100. Such training may be performed using a single set of training data, rather than using one set of training data for speech decoding and another for punctuation prediction. This not only reduces the time and effort needed to perform training, but can also increase the accuracy of punctuation prediction because punctuation is predicted jointly with the word sequence using the same written-form language model.

For example, the decoder 102 may use the language model 108 to decode the first portion 106*a* into the first word 104*a* in step 202, use the same language model 108 to predict the punctuation mark 104*b* in step 206, and use the same language model 108 again to decode the second portion 106*b* into the second word 104*c*. As a result, the choice of punctuation mark 104*b* that is predicted in step 204 may be based at least in part on the first word 104*a* that results from decoding step 202, because the language model 108 may specify different probabilities for different punctuation marks depending on the choice of the first word 104*a*. For the same reason, the second word 104*c* resulting from the decoding step 210 may be based at least in part on the previous choice of punctuation mark 104*b* and possibly also the decoded first word 104*a* (and possibly also one or more previous tokens, such as words or punctuation marks).

A detailed example of one way to implement the system 100 of FIG. 1 will now be described. In one embodiment of the present invention, the speech decoder 102 is a single-prefix-tree LVCSR decoder which uses a priority heap to represent alternative linguistic theories in each node of the prefix tree. One benefit of the heap approach with a single prefix tree is that it is more dynamic, more scalable, and allows different search and pruning techniques to be employed by effectively controlling hypothesis merging. The use of the heap approach, however, is not a limitation of the present invention.

In one embodiment, when decoding input speech using the single-prefix-tree and a Viterbi beam search, the result graph is expanded with new word transitions at each frame by inspecting the heaps of all leaf and stub nodes in the prefix tree. A "leaf node" in the prefix tree represents a particular word pronunciation and does not have any further child nodes. A leaf node also models a set of possible right (next word) phonetic contexts. A stub node in the prefix tree represents a single-phone word pronunciation (for instance 'a'). A stub node acts as both a normal tree node and a leaf node. Since we model phonetic contexts across word boundaries, a stub node is unique in that it models both a set of left and a set of right phonetic contexts.

Figure 3:
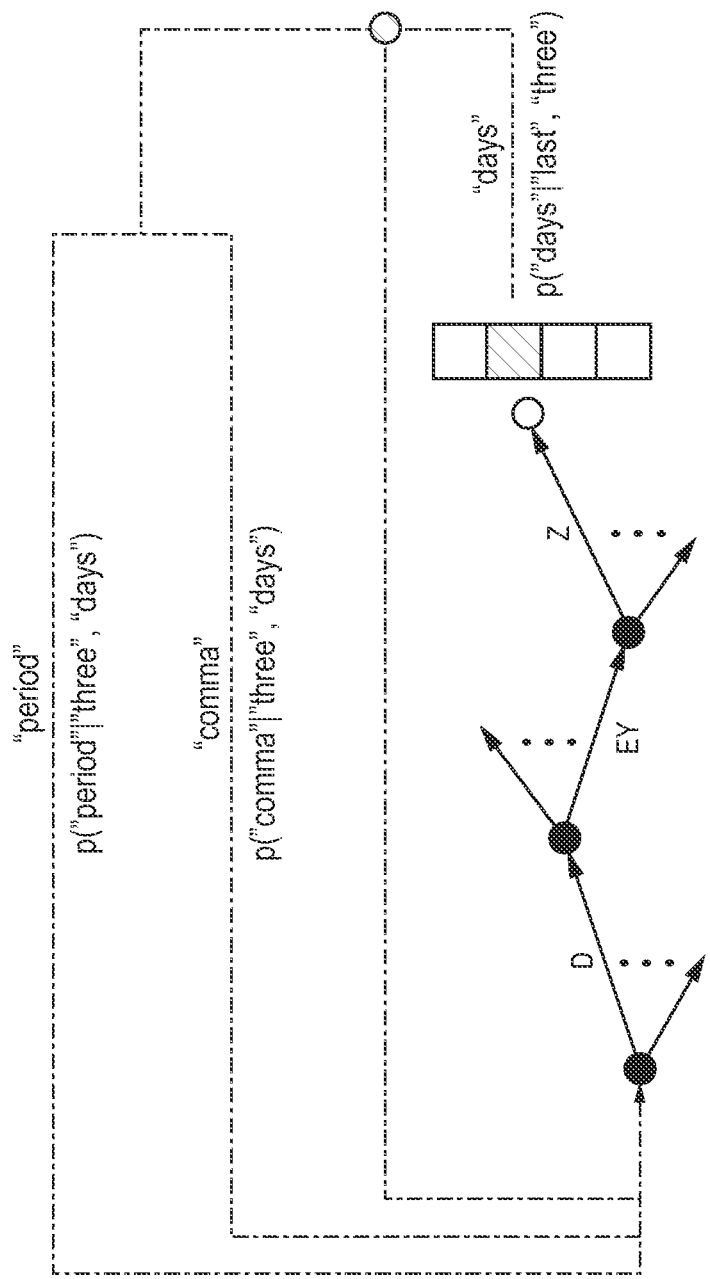
FIG. 3 is a diagram of an example of a prefix tree in use in one embodiment of the present invention.

The most probable entries across all of the heaps of all of these nodes are expanded by adding the corresponding word to the result graph, and re-entering the prefix tree at the appropriate roots and stubs using the FSM states resulting from the word transition. To apply this approach to auto-punctuation, each entry selected for expansion in each frame is expanded by taking not only the corresponding word transition, but also any additional, non-verbalized punctuation transitions that are possible in the given context, before re-entering the prefix tree, as shown in FIG. 3.

Non-verbalized punctuations only contribute to a transition's language model score. As a result, all transitions for a given word share a common acoustic score and phonetic context. The transitions with additional non-verbalized punctuations compete with all other transitions in a given frame. Therefore, existing pruning strategies may be used to weed out unlikely paths, including those involving non-verbalized punctuations. Furthermore, this kind of auto-punctuating decoder may be implemented with almost no computational overhead by adding a threshold pruning step such that an auto-punctuation transition is only followed if the probability of the punctuation given the current word history is above an empirically determined minimum probability.

Experiments were performed on the auto-punctuation decoder just described, using data from a medical transcription domain. The training data consisted of documents from an Internal Medicine corpus with a total of 2.9 billion word tokens. The test data consisted of 120 held-out documents from the same corpus consisting of 109,000 word tokens. The test data included speech from 25 different speakers.

The experiment used 39 dimensional MFCC acoustic feature vectors and trigram language models. Multiple language models (e.g., speaker-independent, speaker-dependent, and domain-dependent language models) were interpolated to form the language model used for decoding. The size of the recognition vocabulary was approximately 57,000 words.

The baseline for comparison consisted of auto-punctuation performed as a post-process to the decoder. The language models used in the decoder were derived from spoken-form text, while the language models used by the auto-punctuation post-processor were derived from written-form text. Only speaker-independent language models were used for the auto-punctuation post-processor.

An auto-punctuation finite state machine and an auto-punctuation decoder were also applied to the same test data. For each of these auto-punctuation approaches, the language model hierarchy in the decoder was replaced with an equivalent hierarchy of language models derived from written-form text.

Table 1 compares the performance of the auto-punctuation finite state machine and auto-punctuation decoder approaches with the performance of the baseline post-processor model.

TABLE 1

| | Baseline (Prior Art) | AP FSM | AP Decoder |
|---|---|---|---|
| # Periods | 3571 | 3571 | 3571 |
| % Period Errors | 33.2 | 28.7 | 25.3 |
| # Commas | 1641 | 1641 | 1641 |
| % Comma Errors | 76.8 | 55.9 | 54.1 |
| Processing Time (as a multiple of real time) | 1.81 | 2.35 | 1.88 |

As can be seen from Table 1, the punctuation prediction error rates decrease significantly for the auto-punctuation finite state machine and the auto-punctuation decoder in comparison to the baseline. Note that the auto-punctuation finite state machine approach leads to a slight increase in the overall processing time by roughly 30%, while the auto-punctuation decoder approach avoids this overhead almost completely (increasing processing time by only 4% compared to the baseline) while at the same time yielding the lowest punctuation prediction error rates. Finally, changes in overall word recognition accuracy were minor and almost exclusively due to changes in punctuations between the baseline and the two proposed approaches, showing that merging the tasks of speech decoding and punctuation prediction need not cause any measurable adverse effects on the pruning behavior of the decoder.

The techniques disclosed herein may be used to increase the accuracy of speech decoding even when they are not used to insert punctuation into the resulting text. For example, the language model 108 may be trained in the manner described above, using training data which includes both text and punctuation. The method 200 of FIG. 2 may then be performed, except that any predicted non-verbalized punctuation is not inserted into the decoder's result data structure 104. In other words, even when a non-verbalized punctuation mark is predicted in step 206, the punctuation mark is not inserted into the token stream 104 (e.g., step 208 is not performed). In the example of FIG. 1, this would result in the token stream 104 (and any document created based on the token stream 104) containing word 104a followed by word 104c, without the intervening punctuation mark 104b. The predicted punctuation mark 104b, however, is retained by the decoder 102 so that it can be used, in conjunction with the language model 108, to predict subsequent words and punctuation. As a result, the method 200 of FIG. 2 may predict punctuation for purposes of increasing the accuracy of word recognition even when it is not used to insert non-verbalized punctuation into the final document.

The predicted punctuation (such as punctuation mark 104b) may be excluded from the token stream 104 in any of a variety of ways. For example, the punctuation mark 104b may be temporarily inserted into the token stream 104, but marked as "non-spoken" to indicate that its inclusion is not intended to be permanent. Then, when the entire speech stream 106 has been recognized, the decoder 102 (or other component of the system 100) may remove any tokens marked as "non-spoken" from the token stream 104. As another example, the decoder 102 may create a first data structure which includes both words and punctuation in the manner described above with respect to FIGS. 1 and 2. Upon completion of recognition of the speech stream 106, the first data structure may be used to create a second data structure in which any predicted punctuation is omitted.

If desired, non-verbalized punctuation marked as "nonspoken" may be retained in the output of the decoder 102, and also included within a text document created from the token stream 104, but kept hidden from users of the document in a variety of ways. For example, assuming that the punctuation mark 104b is a non-verbalized punctuation mark, the punctuation mark 104b may be included within a document created from the token stream 104, but marked as non-verbalized punctuation or otherwise marked as hidden text so that the punctuation mark 104b is not displayed to users of the document. The resulting document rendering will include the first word 104a followed by the second word 104c, without the punctuation mark 104b between them.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although the component 102 shown in FIG. 1 is labeled as a "decoder," this is merely a label and does not constitute a limitation of the invention. For example, although component 102 may be implemented by starting with an existing speech recognition decoder and modifying it to perform the functions disclosed herein, this is not required. Rather, the component 102 may be implemented as any means for performing the functions disclosed herein. As yet another example, the component 102 may be implemented using, for example, a combination of hardware and/or software components, each of which performs a different sub-function described above.

Although in certain examples described above, punctuation is predicted based on a single previous word (or other token), this is not a limitation of the present invention. Instead, for example, punctuation may be predicted in accordance with embodiments of the present invention based on any number of previous tokens. For example, if an (n+1)-gram language model is used, then punctuation may be predicted using the previous n words.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer program instructions stored on at least one non-transitory computer-readable medium, the method comprising:
   (A) automatically decoding, by a speech decoder executed by the at least one computer processor, using Viterbi decoding for Large Vocabulary Conversational Speech Recognition (LVCSR), a first portion of an audio signal into a first word in a token stream;
   (B) after (A),
      (B-1) selecting, by the speech decoder, a punctuation mark without using acoustic evidence from the audio signal;
      (B-2) inserting, by the speech decoder, the punctuation mark into the token stream at a position after the first word; and
   (C) after (B), decoding, by the speech decoder, a second portion of the audio signal into a second word in the token stream at a position after the punctuation mark; and
   (D) before (A), training a language model using a document corpus, wherein the document corpus includes words and punctuation;
   wherein the first portion and second portion of the audio signal are contiguous within the audio signal;
   wherein (A) comprises using the language model to decode the first portion of the audio signal into the first word;
   wherein (B) comprises using the language model to select the punctuation mark; and
   wherein (C) comprises using the language model to decode the second portion of the audio signal into the second word.

2. The method of claim 1, wherein the token stream comprises a document, wherein the first word comprises first text in the document, wherein the punctuation mark comprises second text in the document, and wherein the second word comprises third text in the document.

3. The method of claim 1, wherein (B) comprises inserting the punctuation mark at the position immediately after the first word in the token stream, and wherein (C) comprises inserting the second word at the position immediately after the punctuation mark in the token stream.

4. The method of claim 1, wherein (B) comprises selecting the punctuation mark based on the language model and the first word.

5. The method of claim 4, wherein (B) comprises selecting the punctuation mark based on the language model, the first word, and at least one additional word before the first word in the token stream.

6. The method of claim 1, wherein (C) comprises using the language model, the punctuation mark, and the first word to decode the second portion of the audio signal into the second word.

7. The method of claim 6, wherein (C) comprises using the language model, the punctuation mark, the first word, and at least one additional word before the first word in a text to decode the second portion of the audio signal into the second word.

8. The method of claim 1, wherein (B) comprises selecting the punctuation mark using the language model.

9. The method of claim 8, wherein (B) further comprises selecting the punctuation mark using the language model and without using an acoustic model.

10. The method of claim 1, further comprising:
(D) creating a data structure containing the first word at a first position and the second word at a second position that is after the first position in the data structure, wherein the punctuation mark is not between the first position and the second position in the data structure.

11. The method of claim 10, wherein (D) comprises:
(D) (1) inserting the punctuation mark between the first position and the second position in the data structure; and
(D) (2) marking the punctuation mark as hidden within the data structure.

12. The method of claim 10, wherein (D) comprises:
(D) (1) inserting the punctuation mark between the first position and the second position in the data structure; and
(D) (2) removing the punctuation mark from the data structure.

13. A non-transitory computer program product tangibly storing computer program instructions executable by a computer processor, the computer program instructions comprising instructions for:

(A) automatically decoding, by a speech decoder executed by the computer processor, using Viterbi decoding for Large Vocabulary Conversational Speech Recognition (LVCSR), a first portion of an audio signal into a first word in a token stream;
(B) after (A),
(B-1) selecting, by the speech decoder, a punctuation mark without using acoustic evidence from the audio signal, and
(B-2) inserting, by the speech decoder, the punctuation mark into the token stream at a position after the first word; and
(C) after (B), decoding, by the speech decoder, a second portion of the audio signal into a second word in the token stream at a position after the punctuation mark; and
(D) before (A), training a language model using a document corpus, wherein the document corpus includes words and punctuation;
wherein the first portion and second portion of the audio signal are contiguous within the audio signal;
wherein (A) comprises using the language model to decode the first portion of the audio signal into the first word;
wherein (B) comprises using the language model to select the punctuation mark; and
wherein (C) comprises using the language model to decode the second portion of the audio signal into the second word.

14. The computer program product of claim 13, wherein the token stream comprises a document, wherein the first word comprises first text in the document, wherein the punctuation mark comprises second text in the document, and wherein the second word comprises third text in the document.

15. The computer program product of claim 13, wherein (B) comprises selecting the punctuation mark based on the language model and the first word.

16. The computer program product of claim 13, wherein (C) comprises using the language model, the punctuation mark, and the first word to decode the second portion of the audio signal into the second word.

17. The computer program product of claim 13, wherein (B) comprises selecting the punctuation mark without using acoustic evidence from the audio signal.

* * * * *